Patented May 22, 1951

2,553,651

UNITED STATES PATENT OFFICE 2,553,651

POLYMERS OF CYCLIC DIMERS OF DIOLEFINS AS PLASTICIZERS FOR OIL RESISTANT ELASTOMERS

Albert M. Gessler, Cranford, N. J., assignor to Standard Oil Development Company, a corporation of Delaware No Drawing. Application June 16, 1948, Serial No. 33,443

4 Claims. (Cl. 260—23)

1

This application is a continuation-in-part of copending application Serial No. 719,637, filed on December 31, 1946, now Patent No. 2,545,516, March 20, 1951.

The present invention relates to synthetic rubber compositions and particularly to improved, plasticized, diolefin-acrylonitrile copolymer compositions and a method of preparing the same.

Synthetic rubber materials prepared by the copolymerization of a conjugated diolefin such as butadiene-1,3 and a nitrile such as acrylonitrile in aqueous emulsion have achieved considerable commercial importance particularly in view of their oil-resistant properties. The superiority in oil resistance of these copolymers over natural rubber has permitted them to compete with and even displace natural rubber despite the fact that the cost of these copolymers has been greater than that of natural rubber.

A major difficulty encountered with all synthetic rubbers of the butadiene type has been the fact that they are in general relatively hard, dry and non-tacky materials and, unlike natural rubber, they are incapable of being masticated to a soft, plastic condition which is not only desirable but necessary for proper compounding and processing into the desired articles.

In order to overcome this difficulty, it has been necessary to add softeners or plasticizers to these synthetic rubbery materials thereby improving their compounding and processing characteristics. The selection of suitable softeners, particularly for diolefin-nitrile type synthetic rubbers has presented a number of serious difficulties since their properties are so radically different from natural rubber that many materials which are compatible with or exert a substantial plasticizing effect upon natural rubber or other rubbery hydrocarbons such as butadiene-styrene copolymers are incompatible with or do not effect any improvement in the softness or plasticity of diolefin-nitrile type synthetic rubbers.

In order to plasticize diolefin-nitrile elastomers, which are known technically under the generic term of GR-A type rubbers, the art has generally sought out those materials which are compatible with said rubbery GR-A type copolymers or are solvents or swelling agents therefor.

A number of cheap solvent-type plasticizers are available for increasing the softness or apparent elasticity of these copolymers. However, all of these cheap plasticizers are coal-tar oils or other aromatic coal-tar derivatives, are dark brown to black in color, cause lacing on the mill and are therefore relatively difficult to mill into GR-A type polymers; furthermore while these plasticizers do increase the softness of the polymers, they do not improve greatly the processing or extrusion properties thereof and finally they are relatively freely extracted from the plasticized

2 polymer on contact with gasoline, thereby discoloring the latter. These undesirable properties disqualify this type of cheap plasticizer from use with GR-A type rubbers where light-colored compounds are required or where a discolored extract cannot be tolerated on contact of the plasticized polymer with gasoline.

Where light-colored articles were desired, such as bowl scrapers, bath mats, gasoline hose, automobile matting and panelling, floor tile, whitewall tire compounds, medical supplies, dairy equipment, sealing members for food packaging and similar specialty products, the rubber industry was forced heretofore to rely on plasticizing agents which not only acted as solvents for the GR-A type polymers, but in addition such agents had to be substantially colorless.

The plasticizers most commonly used for the aforementioned specialty products have been dialkyl phthalates such as dimethyl, diethyl, dibutyl, or dioctyl phthalates, dialkyl esters of dicarboxylic aliphatic acids such as dibutyl sebacate, and phosphoric acid esters such as tricresyl phosphate or tributoxy-ethyl phosphate. However, the preparation of the aforementioned organic chemicals usually involves a more or less complex chemical synthesis, and hence the chemicals themselves are about 10 times as expensive as the dark-colored coal-tar plasticizers mentioned previously. Since the plasticization of GR-A type elastomers requires relatively large proportions of plasticizing agent, e. g. 3 to 40 or more parts by weight per 100 parts of the elastomers, it will be readily appreciated that the use of the above-named organic chemicals as plasticizers becomes prohibitive where low-priced articles are to be manufactured. Accordingly, the ues of GR-A type elastomers has been heretofore largely restricted to high-priced quality or specialty articles, or to low-priced articles wherein the use of coal-tar plasticizers could be tolerated despite the previously described disadvantages of the latter.

In the copending application Serial No. 719,637 the new basic concept applicable to the plasticizing of GR-A elastomers was described thoroughly and need not be repeated here. This concept offers a highly successful alternative to the use of the aforementioned expensive chemicals and consists of using plasticizers which, though compatible, are inherently immiscible with the polymer to be plasticized.

It has now been discovered that viscous polymers of diolefins having 4 to 5 carbon atoms, such as polybutadiene, polyisoprene or polypiperylene, or of the respective cyclic dimers thereof, are particularly effective for plasticizing nitrile rubber when these polymers are of a molecular weight which is high enough to prevent bleeding of the plasticizer from the plasticized composition and low enough to make the plasticizer compatible and coherent with the polymer to be plasticized. The desired molecular weight range of the herein claimed polymeric hydrocarbon plasticizers appears to lie within the limits of (8000) to (20,000) or preferably (10,000) to (15,000), as determined by the Staudinger method.

The viscous polymers can be prepared by any of the known methods including emulsion polymerization described for example in copending U. S. patent application Serial No. 637,782, filed on December 28, 1945, by P. K. Frolich et al. now Patent No. 2,500,983, March 21, 1950; sodium-catalyzed mass polymerization; or by peroxide catalyzed mass polymerization, the details of which are described for example in copending U. S. patent application Serial No. 782,850, filed on October 29, 1947, by E. Arundale et al. Instead of the polymers prepared by any of the aforementioned methods, an excellent plasticizer can be obtained by thermally polymerizing dimers of conjugated $C_4$ to $C_5$ diolefins such as butadiene or piperylene according to the method the details of which are described in copending U. S. patent application Serial No. 638,589, filed on December 31, 1945, by M. W. Swaney et al. now Patent No. 2,513,244, June 27, 1950. Furthermore, instead of polymerizing a diolefin such as butadiene by itself, it can be advantageously copolymerized with a vinyl aromatic hydrocarbon such as styrene, alpha-methyl styrene, para-methyl styrene, or alpha-methyl-para-methyl styrene, or the corresponding ethyl styrenes, vinyl naphthalene and the like.

One convenient method of preparing the desired plasticizers comprises placing the following charge in a one-quart pressure bottle:

| | Grams |
|---|---|
| Water | 400 |
| Butadiene | 200 |
| Sodium soap | 10 |
| Potassium persulfate | 0.6 |
| Di-isobutylene mercaptan | 8 |

The bottle containing this charge is placed on a rotating wheel in a water bath maintained at 55° C. and mixed for 20 hours. The reaction mixture is finally short-stopped and unreacted butadiene stripped off with live steam. The resulting latex of the oily polymer can be used directly as to effect the plasticizing by mixing it with the latex of the nitrile rubber to be plasticized, whereafter the mixed latex is coagulated; or the latex of oily polymer may be coagulated separately and the resulting oily polymer can be subsequently mixed into separately coagulated nitrile rubber mechanically on a rubber mill or in an internal mixer.

The aforementioned recipe can of course be varied by substituting known equivalents for the ingredients mentioned. For example, isoprene can be used instead of butadiene; the soap may be any alkali metal or ammonium soap of a higher fatty acid having 6 to 18 carbon atoms such as caproic, stearic, palmitic or linoleic; or it may be a synthetic soap such as an alkali sulfonate, alkyl aromatic sulfate, etc.; other known oxygen yielding catalysts such as benzoyl peroxide or cumene hydroperoxide can be used instead of the alkali persulfate; and mercaptans having 6 to 16 carbon atoms, notably a commonly available mixture of aliphatic mercaptans consisting predominantly of dodecyl mercaptan can be used in place of the di-isobutylene mercaptan.

EXAMPLE I

A set of runs was carried out to evaluate the ease and speed with which Perbunan could be plasticized by polybutadiene oils.

The polybutadiene oils were added on a 6″ x 12″ mill to Perbunan having 26 weight percent of combined acrylonitrile and 74 weight percent of combined butadiene. The starting temperature was controlled between 90° and 100° F., and cooling water was supplied to the rolls during the mixing. The Perbunan was broken down before any additions were made by passing it six times through the mill set at 0.007″. The blends which were prepared and the time required to add a given amount of plasticizer are listed in Table I below. A control compound with dibutyl phthalate is included.

*Table I*

| Run No. | Type of Plasticizer | Parts of Plasticizer Per 100 Parts of Perbunan-26 | Time to add Plasticizer (Minutes) | Remarks |
|---|---|---|---|---|
| 1 | Dibutyl Phthalate | 20 | 9 | Initial addition difficult. |
| 2 | Polybutadiene (polymerized by emulsion method) Intrinsic Vis. 0.134.[1] | 10 | 18 | Initial addition very difficult. Mixed stock bags. |
| 3 | Polybutadiene (polymerized by sodium technique) Int. Vis. 0.456.[1] | 10 | 1 | No difficulty. Easy blending. |
| 4 | ----do---- | 20 | 2½ | Do. |
| 5 | Polybutadiene (mass polymerized) Int. Vis. 0.368.[1] | 10 | 5½ | Initial addition slow. |
| 6 | ----do---- | 20 | 7 | Do. |
| 7 | Polymerized Vinyl Cyclohexene [2] | 10 | 1½ | No difficulty. Easy blending. |
| 8 | ----do---- | 20 | 2½ | Do. |
| 9 | ----do---- | 30 | 3 | Do. |

[1] Intrinsic viscosity $I = \ln N/C$, where $N$ is the relative viscosity, i. e., the ratio of the viscosity of the polymer solution to the viscosity of the solvent (di-isobutylene at 25° C.), and where $C$ is the concentration of the polymer solution expressed in grams of polymer per 100 cc. of solution. Knowing the intrinsic viscosity $I$, the molecular weight $M$ of the polymer can then be calculated from the following formula:
$$I = 11 \times 10^{-4} \times M^{0.62}$$
[2] This material was a cyclic butadiene dimer further polymerized by thermal mass synthesis at 280° C.–300° C. for 24 hours, the oily polymer being recovered from the viscous, resin-containing polymerization product by extraction with methyl ethyl ketone.

As has been pointed out previously, the ease with which plasticizer may be added to a polymer on the mill is dependent on the viscosity of the plasticizer. With fluid liquids, addition is difficult and must be made intermittently and slowly to avoid breaking the formed band. As the viscosity of the plasticizer is increased beyond the consistency of honey or heavy molasses, the addition becomes easier. When the plasticizer is a semi-solid, like molding putty or heavy asphalt, addition may be made rapidly and incorporation is almost instantaneous.

Chemical character or miscibility of the plasticizer, though not quite as important as viscosity, also influences the ease of mill addition. At highly fluid levels, immiscible plasticizers are more difficult to incorporate with the polymer than miscible plasticizers. At the semi-solid state mentioned above, there is no significant difference in the rate at which the two types of plasticizer can be mixed with the polymer.

These facts are substantiated by the data in Table I. The long mixing times required with the fluid miscible plasticizer, dibutyl phthalate, in run No. 1 and with the low viscosity polybutadiene oil in run No. 2 are typical examples.

After incorporation of the dibutyl phthalate, the stock was still highly elastic. The band around the roll was knurled and the bank only moderately active. When cut from the mill the stock shrank rapidly to form a chunk rather than a sheet of rubber. In contrast, in every case with the immiscible polybutadiene oils, the stocks were characterized by greatly diminished elasticity such as is highly advantageous for extrusion, calendering, molding, etc. Smooth bands without surface irregularity or rugosity were formed around the mill roll. The bank was extremely active and the stock when cut from the mill formed smooth sheets, a result realized from the lessened tendency for elastic shrinkage.

oven at 220° F., and allowed to rest for 10 minutes on a liberally talced base. The specimens were cooled for 5 minutes at room temperature after the heating period and their lengths and weights measured. From the specific gravity of the stock and from the measurements of weight and length taken, the unit volume, in cubic centimeters per linear inch, was calculated for each tube.

A material, if it were purely plastic, would extrude to die dimensions and would have, under the conditions employed here, a unit volume of 0.90 cubic centimeter per inch. This value, therefore, may be taken as the ideal value representing the most desired case of purely plastic behavior. However, elastic tendencies of high polymer systems result in tube volumes which are greater than the ideal value, the difference between the actual and ideal tube volumes being proportional to the degree of elasticity present. It is thus possible to relate processibility to the stock swell at the die of the extruder. This has been done for the plasticized blends shown in Table I. The data, which include the results obtained from a sample of broken-down Perbunan without any added plasticizer, and from a series of Perbunan-polyisobutylene plasticizer (12,000 Staudinger molecular weight) systems are shown in Table II.

*Table II*

| Run No. | Plasticizer | | Elastic Swell (Volume of Extruded Tube in cc./Inch) | Per Cent Elastic Swell (Based on Ideal Volume of 0.90 cc./inch) | Per Cent Change of Natural Swell (Based on 2.67 cc./inch Volume of Non-Plasticized Perbunan-26) | Rate of Extrusion, Inches Per Minute |
|---|---|---|---|---|---|---|
| | Type | Parts Per 100 Parts of Perbunan-26 | | | | |
| 1 | None | None | 2.67 | 195 | | 30 |
| 2 | Dibutyl Phthalate | 10 | 3.49 | 287 | +30.7 (Increase) | 35.5 |
| 3 | do | 20 | 3.39 | 277 | +27.0 (Increase) | 38 |
| 4 | do | 30 | 3.36 | 273 | +25.9 (Increase) | 40.5 |
| 5 | do | 40 | 3.28 | 265 | +22.9 (Increase) | 43 |
| 6 | Polybutadiene Int. Vis. 0.134. | 10 | 1.94 | 115 | −27.3 (Reduction) | 72 |
| 7 | Polybutadiene Int. Vis. 0.456. | 10 | 2.00 | 123 | −25.1 (Reduction) | 47 |
| 8 | do | 20 | 1.80 | 100 | −32.6 (Reduction) | 64 |
| 9 | do | 40 | 1.64 | 83 | −38.6 (Reduction) | |
| 10 | Polybutadiene Int. Vis. 0.368. | 10 | 1.88 | 110 | −29.6 (Reduction) | 51 |
| 11 | do | 20 | 1.52 | 70 | −43.0 (Reduction) | 82 |
| 12 | do | 40 | 1.4 | 56 | −46.7 (Reduction) | |
| 13 | Polymerized Vinyl Cyclohexene. | 10 | 1.68 | 87 | −37.0 (Reduction) | 92 |
| 14 | do | 20 | 1.52 | 70 | −43.0 (Reduction) | 92 |
| 15 | do | 30 | 1.44 | 60 | −46.0 (Reduction) | 96 |
| 16 | do | 40 | 1.4 | 56 | −46.7 (Reduction) | 97 |
| 17 | Polyisobutylene (M. W. 12,000). | 10 | 2.04 | 128 | −23.6 (Reduction) | 53 |
| 18 | do | 20 | 1.80 | 100 | −32.6 (Reduction) | 63 |
| 19 | do | 30 | 1.70 | 89 | −36.2 (Reduction) | 71 |
| 20 | do | 40 | 1.50 | 67 | −43.7 (Reduction) | 77 |

EXAMPLE II

To further evaluate the processibility of Perbunan-polybutadiene systems the extrusion test was employed. With a constant worm speed of 80 revolutions per minute, and at a temperature (barrel and head) of 220° F., the #½ Royle extruder was fixed with die and pin to form a tube (0.4 inch outside diameter and 0.05 inch wall thickness). Constant stock temperature was assured by cycling the material twice through the machine. On the third pass, tube sections representing 30 seconds of running time were collected and taken directly to an air circulating From Table II it can be seen that the polybutadiene oils are even more effective processing aids for Perbunan than polyisobutylene. The elasticity of the prepared blends decreases sharply with polybutadiene concentration and the stocks soon approach the range of excellent processing performance. By contrast the increase in elasticity shown for the dibutyl phthalate blends is typical of the behavior of miscible plasticizer systems, once again emphasizing the fact that while miscible polymers are useful to increase the softness, i. e., reduce the force required to cause a given deformation of the raw plasticized composition, they actually tend to aggravate the elastic swell on extrusion and similar processing operations requiring a shaping or deformation of the composition.

In contrast, the immiscible plasticizers actually cause an extremely favorable reduction of elastic swell or spring-back, as is illustrated especially clearly in the penultimate column of figures in Table II. These figures show that compositions plasticized in accordance with the present invention exhibit an elastic swell which is a mere fraction, e. g., 20 to 50% of the corresponding swell of the non-plasticized basic nitrile polymer whereas miscible plasticizers bring about an elastic swell which is actually larger than the swell of the non-plasticized nitrile polymer. The effect of the polymerized vinyl cyclohexene is particularly striking at concentrations between 5 and 20 percent, the reduction of elastic swell at 10 percent concentration of this last-named polymeric plasticizer being not only far below anything achieved by any other known plasticizer, but also substantially below the values obtained by using the other types of polybutadiene oils in accordance with the present invention. No explanation for this unusual effectiveness is available as yet though there are certain indications from runs employing butadiene-styrene copolymer oils that aromatic rings in the polymer chain of the plasticizer may tend to accentuate its beneficial effect on processing characteristics.

Another important advantage is brought out by a consideration of the data contained in the last column of Table II. The factory compounder must have stocks which are plastic so that he can shape them, prior to vulcanization, into useful articles. In addition, because the rubber industry is highly competitive, he must have compounds which process rapidly. The great advantage which the immiscible systems enjoy in this respect is shown by the extrusion rate data of Table II where the rate of tube exit from the extruder, based on equilibrium specimen dimensions (i. e., dimensions after substantially total release of elastic stresses) is expressed as a function of the plasticizer concentration. With dibutyl phthalate only moderate increase in extrusion rate is realized. With the polybutadiene oils and polyisobutylene, the rate of tube exit increases rapidly with plasticizer concentration and very soon reaches a value two to three times that of the original. The very sharp increase in extrusion rate obtained with the vinyl cyclohexene polymer at low concentrations is once again outstanding.

Other things being the same, the volume of the tube extruded from any stock increases as the rate of extrusion is increased. From this fact, it is all the more surprising that, with the immiscible systems now discovered, the unit equilibrium volume of the tube is decreasing sharply at the same time that the rate of tube exit is increasing so rapidly.

EXAMPLE III

Using a convention mechanical goods formulation, a number of Perbunan vulcanizates was prepared with the polybutadiene oils to determine the effect of these oils on vulcanizate quality. These compounds, along with two controls, are shown in Table III. Also included are the data from a few routine tests carried out with these vulcanizates.

*Table III*

| Compound | 1 | 2 | 3 | 4 | 5 | 6 |
|---|---|---|---|---|---|---|
| Perbunan-26 | 100.0 | 100.0 | 100.0 | 100.0 | 100.0 | 100.0 |
| Dibutyl Phthalate | | 20.0 | | | | |
| Polybutadiene (I. V. 0.134) | | | 20.0 | | | |
| Polybutadiene (I. V. 0.456) | | | | 20.0 | | |
| Polybutadiene (I. V. 0.368) | | | | | 20.0 | |
| Polymerized Vinyl Cyclohexene | | | | | | 20.0 |
| Zinc Oxide | 5.0 | 5.0 | 5.0 | 5.0 | 5.0 | 5.0 |
| Stearic Acid | 1.5 | 1.5 | 1.5 | 1.5 | 1.5 | 1.5 |
| Semi-Reinforcing Black (Gastex) | 75.0 | 75.0 | 75.0 | 75.0 | 75.0 | 75.0 |
| Sulfur | 1.5 | 1.5 | 1.5 | 1.5 | 1.5 | 1.5 |
| Benzothiazyl Disulfide | 1.0 | 1.0 | 1.0 | 1.0 | 1.0 | 1.0 |
| Tensile—Elongation, Modulus @ 300%, Cured at 287° F.: | | | | | | |
| 10' | 2,555—565 1,430 | 1,710—740 610 | 1,195—660 505 | 960—535 520 | 875—595 440 | 360—795 180 |
| 20' | 2,920—500 2,030 | 2,140—655 970 | 1,745—615 865 | 1,600—545 780 | 1,525—545 800 | 1,630—660 505 |
| 45' | 3,000—435 2,365 | 2,450—595 1,315 | 1,925—555 1,180 | 2,000—495 1,295 | 1,910—535 1,060 | 2,190—620 935 |
| 60' | 3,185—405 2,600 | 2,290—525 1,375 | 2,100—480 1,395 | 2,070—460 1,395 | 1,935—485 1,230 | 2,130—595 950 |
| 90' | 3,300—400 2,710 | 2,370—480 1,590 | 2,170—480 1,500 | 2,085—420 1,510 | 1,900—445 1,200 | 2,315—600 1,205 |
| ASTM #3 Oil at— | | | | | | |
| Room temperature | 57.6 | 42.5 | 87.6 | 100.8 | 111.2 | 75.5 |
| 300° F | 26.7 | 10.5 | 58.4 | 86.0 | 87.4 | 41.5 |
| ASTM #1 Oil at— | | | | | | |
| Room temperature | 11.2 | 6.4 | 20.4 | 26.1 | 28.8 | 17.8 |
| 300° F | 0.3 | 10.8 | 5.3 | 10.4 | 11.8 | 3.2 |
| Thiokol Bend Test | OK at −80° F. | Broke at −75° F. | OK at −80° F. | Broke at −75° F. | OK at −80° F. | Broke at −55° F. |

From the tensile data in Table III it is seen that good vulcanizate quality can be obtained with polybutadiene oils. When the moduli for each vulcanizate in the table are graphed as a function of the time of cure, it appears that the polybutadiene oils in compounds Nos. 3 and 4 are approximately equivalent to dibutyl phthalate in effect on cured properties. With the polybutadiene oils of compounds Nos. 5 and 6 the vulcanizates are characterized by lower modulus. However, it should be observed that this effect in the case of compound No. 5 is not related to cure rate since the elongation of the vulcanizates is not higher than that obtained with dibutyl phthalate or with the oils of compounds Nos. 3 and 4.

The volume increase data in Table III show the increased vulcanizate swell which results from diluting the acrylonitrile content of the matrix polymer with covulcanizable polybutadiene. The low apparent swell obtained with the vulcanizate containing dibutyl phthalate is caused by extraction of the plasticizer from the vulcanizate. The sharp differences in the magnitude of swell of the compounds with the various polybutadiene oils is probably a result of differences in the covulcanization and extraction tendencies of the polybutadienes.

From the Thiokol Bend Test data, it is apparent that vulcanizates with attractive low temperature properties may be prepared from the polybutadiene oils.

EXAMPLE IV

Instead of plasticizing the nitrile polymer by adding thereto the polybutadiene on the mill, excellent plasticizing can be obtained by mixing the nitrile polymer while still in latex form with a suitable amount of a latex of a polybutadiene prepared by the emulsion polymerization method described ahead of Example I hereinabove. This is illustrated by the following example.

The following latices were used:

1. Perbunan-35 (butadiene-acrylonitrile emulsion copolymer):
   Mooney viscosity at 212° F.; 2 min_____ 83
   Acrylonitrile content of polymer
   _____per cent__37.1
   Solids content of latex_____do____24.3
2. Polybutadiene oil (intrinsic vis. 0.4):
   Mooney viscosity at 212° F.; 2 min_____ 41
   Polymer content of latex____per cent__ 25

660 parts by weight of latex #1 was blended with 160 parts of latex #2 and the pH of the resulting mixture was adjusted to 8.8 by the addition of a small amount of 1. N NaOH. The final latex was creamed by the addition of 0.8 volume of 26% NaCl solution per volume of latex, the brine being added to the latex. The particle size of the coagulate was adjusted by the addition of about 80 cc. of 1% acetic acid. The liquor was then filtered from the coagulate and the polymer was then slurried in distilled water to remove residual inorganic salts. After filtering and slurrying a second time the final washed coagulate was filtered to a water content of about 50% and then dried in a circulating air oven for 8 hours at 175° F. The final polymer blend resulting from this coprecipitation method had the following analysis:

Acrylonitrile content _____per cent__ 29.7
Mooney viscosity at 212° F.; 2 min _____ 60

The processing characteristics of this coprecipitated polymer blend were determined according to the extrusion test described in Example II. The results obtained were as follows:

Extrusion rate_____ 72 inches/min. (154 grams/min.)
Extrusion volume_____ 1.867 cc./inch When compared with the data of Table II, these figures show the excellent effectiveness of this method of plasticizing by coprecipitating the principal polymer with the plasticizer in latex form. The present results are particularly remarkable when the fact is taken in account that the nitrile polymer used in this example had about 37% of combined nitrile, thereby being especially tough and immiscible, whereas the nitrile polymer used in the series of runs summarized in Table II had only about 26% of combined nitrile and was correspondingly more workable to begin with.

The properties of the coprecipitated polymer blend in vulcanized state are also very good as shown by the subjoined data obtained on a compound of the following composition:

|  | Parts by weight |
|---|---|
| Coprecipitated polymer blend (described above) | 100 |
| Channel Black (Kosmobile-66) | 50 |
| Zinc oxide | 5 |
| Stearic acid | 1.0 |
| Sulfur | 2.0 |
| Benzothiazyl disulfide (Altax) | 1.0 |

When cured at 287° F., the above compound had the following properties:

|  | Time of Cure | | |
|---|---|---|---|
|  | 20 min. | 45 min. | 90 min. |
| Tensile Strength (#/sq. in.) | 950 | 3,315 | 3,325 |
| Elongation, Per Cent | 435 | 505 | 415 |
| Modulus at 300% | 815 | 1,870 | 2,385 |
| Modulus at 400% | 950 | 2,665 | 3,175 |
| Solvent Swell, Per Cent [1] (Volume Increase) |  | 44.0 |  |

[1] After immersion for 48 hours at room temperature in a 50-50 mixture of ASTM #3 oil and ASTM #1 oil (20% aromatic).

The oil resistant synthetic rubbery materials which are plasticized by the polymerized diolefin oils in accordance with the present invention are the emulsion copolymers of a major proportion of a conjugated diolefin of from 4 to 6 carbon atoms per molecule, preferably butadiene-1,3, piperylene, isoprene or dimethyl butadiene and a minor proportion of an acrylic nitrile, preferably acrylonitrile, methacrylonitrile, or halogenated acrylonitriles such as alpha chloro-acrylonitrile and the like. While the diolefin must constitute the preponderant amount of the polymerizable material, it is ordinarily preferable to utilize monomeric mixtures of from 55 to about 85 parts of diolefin with 45 to about 15 parts of nitrile.

The copolymers of diolefin and nitrile are prepared, as is well known in the art, by emulsifying the monomeric material in from an equal to a two-fold quantity of water utilizing a water-soluble soap or other surface active agent as an emulsifier, an oxygen-yielding polymerization catalyst such as hydrogen peroxide, alkali metal or ammonium persulfates and perborates and if desired, polymerization modifiers such as aliphatic mercaptans of at least six carbon atoms per molecule. Polymerization is ordinarily effected to about 20 to about 65° C. and is continued until the monomers are about 75 to 80% converted to polymers. Other oil-resistant polymers to which the present invention is applicable are polyvinyl chloride, polyvinyl acetate, elastomers prepared by the condensation of ethylene dichloride with sodium tetrasulfide (Thiokol, GR-P) and the like.

These rubbery polymers are readily plasticized according to the present invention by adding thereto between 5 and about 50, preferably between 15 and 30 parts of oily diolefin polymers having a Staudinger molecular weight between about 10,000 and 20,000, or an intrinsic viscosity between about 0.1 and 0.8, preferably between 0.2 and 0.6. Further modification of properties can also be obtained by mixing the rubbery nitrile polymer, in addition to ordinary compounding and vulcanizing ingredients, with varying quantities of other high molecular weight substances such as natural rubber, GR-S, GR-I or the like. Furthermore, certain complementary non-solvating plasticizers such as diethylene glycol phthalate, linseed oil polymer-gel, polybutene of proper molecular weight and the like may be used along with the polydiolefin oils which constitute the essential plasticizing ingredient of the present invention as described in the foregoing examples.

However, it will be understood that these examples are merely illustrations of the invention which is by no means limited thereto, but that numerous variations are possible without departing from the scope of the invention as defined in the appended claims.

It is claimed:

1. A vulcanizable composition of matter comprising 100 parts of solid, rubber-like emulsion copolymer of 85 to 60% of butadiene and 15 to 40% of acrylonitrile and, as a softening agent therefor, 5 to 20 parts of viscous polymerized vinyl cyclohexene having a Staudinger molecular weight between 10,000 and 20,000.

2. A vulcanizable composition of matter comprising 100 parts of a solid, rubber-like emulsion copolymer of about 74% of butadiene with about 26% of acrylonitrile; about 20 parts of an oily thermally polymerized vinyl cyclohexene having a Staudinger molecular weight within the range of 8,000 and 20,000; about 75 parts of carbon black; about 5 parts of zinc oxide; about 1.5 parts of stearic acid; about 1.5 parts of sulfur and about 1 part of benzothiazyl disulfide.

3. An improved extrusion method which comprises mixing 100 parts of a solid, rubber-like emulsion copolymer of 85 to 60% of butadiene and 15 to 40% of acrylonitrile, with 5 to 40 parts of polymerized vinyl cyclohexene having a Staudinger molecular weight between 10,000 and 20,000 and passing the resulting mixture through an extrusion zone at a temperature of about 220° F.

4. A vulcanizable composition of matter comprising 100 parts of a solid, rubber-like emulsion copolymer of 85 to 60% of butadiene and 15 to 40% of acrylonitrile and, as a softening agent therefor, 5 to 20 parts of viscous polymer of vinyl cyclohexene having a molecular weight between 10,000 and 15,000 prepared by heating vinyl cyclohexene at 280 to 300° C. and separating the viscous polymer from the reaction product by extraction with methyl ethyl ketone.

ALBERT M. GESSLER.

REFERENCES CITED

The following references are of record in the file of this patent:

UNITED STATES PATENTS

| Number    | Name          | Date         |
|-----------|---------------|--------------|
| 2,475,234 | Gleason et al. | July 5, 1949 |
| 2,500,983 | Frolich et al. | July 5, 1949 |

FOREIGN PATENTS

| Number  | Country       | Date           |
|---------|---------------|----------------|
| 492,998 | Great Britain | Sept. 30, 1938 |
| 705,104 | Germany       | Apr. 17, 1941  |

OTHER REFERENCES

Rubber Age (U. S.), August 1945, pp. 565, 568, 569.

Rubber Age and Synthetics (Br.) Feb. 1946, pp. 321, 322.

Stocklin: Pages 51 and 58, Transactions, Inst. of Rubber Industry, vol. 15, June 1939.

Talalay et al.: "Synthetic Rubber from Alcohol," pages 96–98; pub., 1945, by Interscience Pub., N. Y.

Ludwig et al.: India Rubber World, Oct. 1944, pages 55 and 56.

Gessler et al.: India Rubber World, May 1947, page 212.

B. I. O. S. Overall Report No. 7, "Rubber Industry in Germany 1939–1945," page 26; pub. in London, 1948.